March 9, 1965      M. MARTENET      3,172,787
METHOD OF MANUFACTURING DETACHABLE WHEEL RIMS
Filed April 17, 1961      6 Sheets-Sheet 1

INVENTOR.
MAURICE MARTENET
BY
McGlew and Toren

March 9, 1965  M. MARTENET  3,172,787
METHOD OF MANUFACTURING DETACHABLE WHEEL RIMS
Filed April 17, 1961  6 Sheets-Sheet 2

INVENTOR.
MAURICE MARTENET
BY
McGlew and Toren

March 9, 1965 M. MARTENET 3,172,787
METHOD OF MANUFACTURING DETACHABLE WHEEL RIMS
Filed April 17, 1961 6 Sheets-Sheet 3

INVENTOR.
MAURICE MARTENET
BY
McGlew and Toren

March 9, 1965  M. MARTENET  3,172,787
METHOD OF MANUFACTURING DETACHABLE WHEEL RIMS
Filed April 17, 1961  6 Sheets-Sheet 4
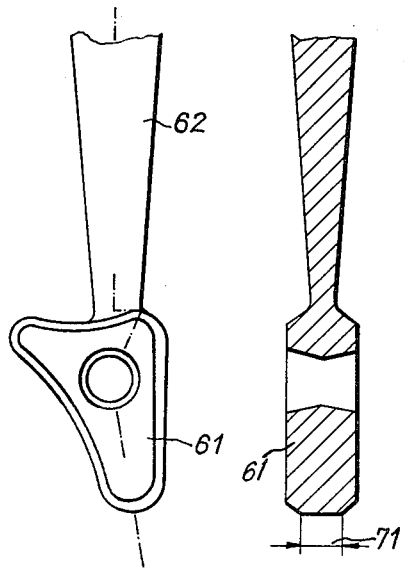
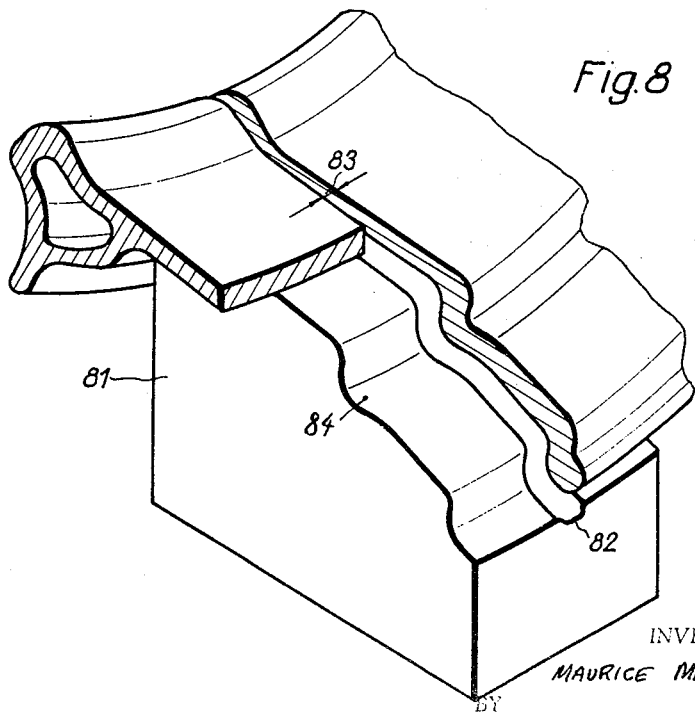
INVENTOR.
MAURICE MARTENET
BY
McGlew and Toren March 9, 1965 M. MARTENET 3,172,787
METHOD OF MANUFACTURING DETACHABLE WHEEL RIMS
Filed April 17, 1961 6 Sheets-Sheet 5

INVENTOR.
MAURICE MARTENET
BY
McGlew and Toren

March 9, 1965 M. MARTENET 3,172,787
METHOD OF MANUFACTURING DETACHABLE WHEEL RIMS
Filed April 17, 1961 6 Sheets-Sheet 6

INVENTOR.
MAURICE MARTENET
BY
McGlew and Toren

United States Patent Office 3,172,787
Patented Mar. 9, 1965

3,172,787
METHOD OF MANUFACTURING DETACHABLE WHEEL RIMS
Maurice Martenet, Rivaz, Vaud, Switzerland, assignor to Georg Fischer Aktiengesellschaft, Schaffhausen, Switzerland, a corporation of Switzerland
Filed Apr. 17, 1961, Ser. No. 103,380
Claims priority, application Switzerland, Feb. 14, 1956, 29,895; Dec. 30, 1960, 14,580/60
14 Claims. (Cl. 148—11.5)

The present invention is a continuation-in-part of application Serial No. 637,967, filed on February 4, 1957, now U.S. Patent No. 2,992,045, granted on July 11, 1961.

This invention relates in general to a method and apparatus for forming a tire rim and in particular to a new and useful method of manufacturing a light metal drop center detachable wheel rim for use with spoke wheels on heavy motor vehicles and trailers.

The aforesaid copending application is related in general to a wheel rim construction and the present invention is concerned with a method of manufacturing wheel rims of a character similar to that set forth in the previous application.

Prior to the present invention, drop center detachable wheel rims have been manufactured from two hot rolled steel sections which are circled and joined together at their circumference by a welding seam which is characteristically weak. In some rim designs, this welding seam is subjected to excessive stresses created by the pneumatic pressures from the tire walls. Attempts have been made to form tire rims by pressing and flanging a single cylindrical steel ring. However, such attempts have not been practical, particularly in a commercial respect.

The manufacture of steel rims for heavy vehicles is extremely difficult, and extremely powerful and heavy machinery is required to form tire rims from cylindrical rings. In some instances, rims for heavy vehicles are made of light metal disc by forging and spinning rim form blanks so that the rims become suitably profiled. Such wheels have not, however, been produced and such methods have not been perfected commercially.

The present invention is particularly concerned with the manufacture of a specific type of rim in which a non-symmetrical extruded hollow profile having a convex rim shoulder portion on one side over a hollow core and a concave rim foot on the opposite side is employed. In accordance with the improved process, the selected profiles are circled by means of a bending machine of the "rolling"-type having three rollers, one inner roller and two outer rollers, to simultaneously expand both flanges of the rim so that the extension of both sides of flanges are equal. The arrangement is such that the process may be carried out without requiring filling of the hollow core in order to complete the circling.

In accordance with the process, in order to finish circling the rims, an equalizing rolling machine is used with its equal sides arranged to smooth down the hitherto convex rim shoulders and evenly and accurately deform the rim faces. Thereafter, the rim profiles are positioned on a welding block and a single weld line is made by means of a shielded inert gas arc welding process. During subsequent operations the rim is precipitation-hardened and calibrated to the finished size and configuration by placing the rim in a stepped cone-shaped die and effecting a pressing thereof.

Accordingly, it is an object of the invention to provide an improved method of forming wheel rims.

A further object of the invention is to provide a method for forming wheel rims by extruding a non-symmetrical one-sided hollow profile from a corrosion resistant aluminum alloy capable of being hardened, thereafter circling the profile while in a soft annealed condition while the opposite side is expanded in order to compensate for expanison on both sides of the rim as it is circled or rounded, thereafter finish-circling or rounding the wheel rim while at the same time flattening a rim shoulder by evenly curving a rim foot thereof, therafter cross-welding the wheel rim, and then hardening and calibrating the wheel rim to the finished size.

A further object of the invention is to provide a method of forming tire rims which is simple to carry out, requires a minimum of operational labor, and is inexpensive to perform.

Still another object of the invention is the provision of a method of forming tire rims which may be used for tires requiring tubes as well as for tubeless tires.

The various features of novelty which characterize the invention are pointed out with particularity in the claims annexed to and forming a part of this specification. For a better understandng of the invention, its operating advantages and specific objects attained by its use, reference should be had to the accompanying drawings and descriptive matter in which there is described and illustrated a preferred embodiment of the invention.

Figure 4:
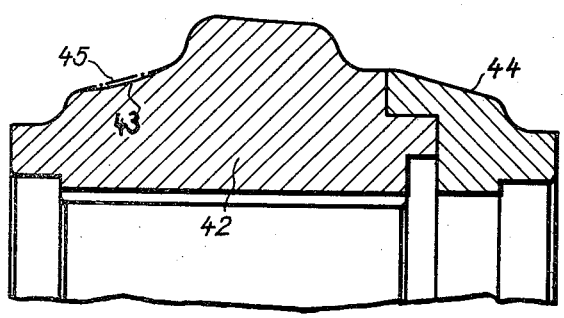
Figure 3:
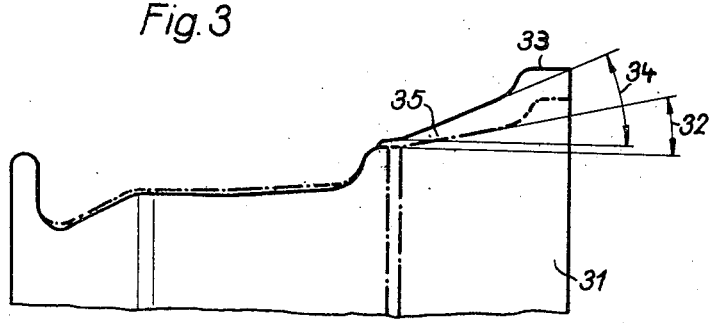
Figure 5:
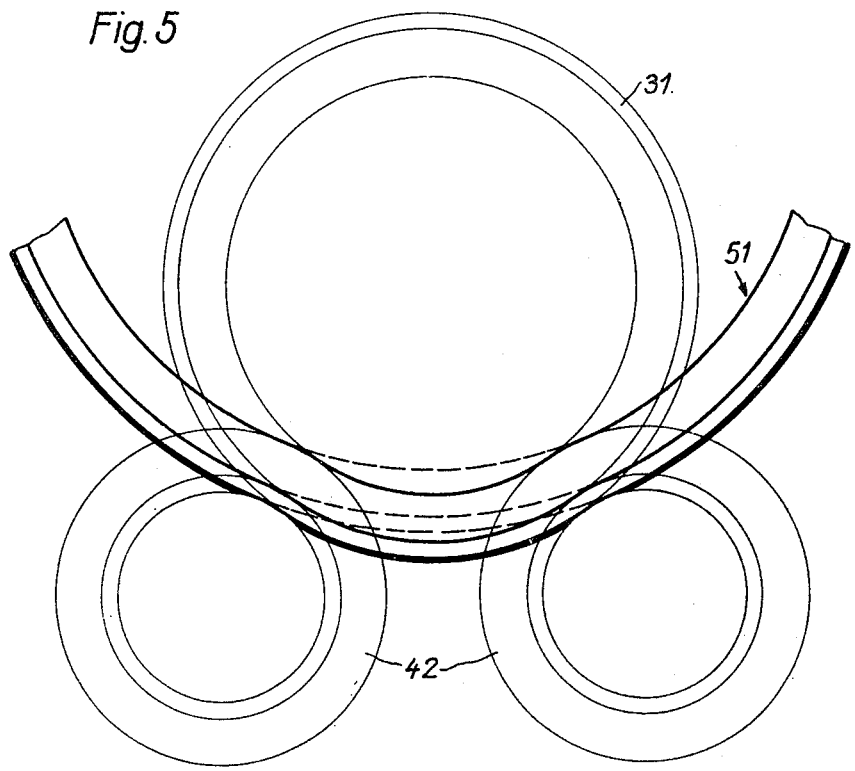
Figure 9:
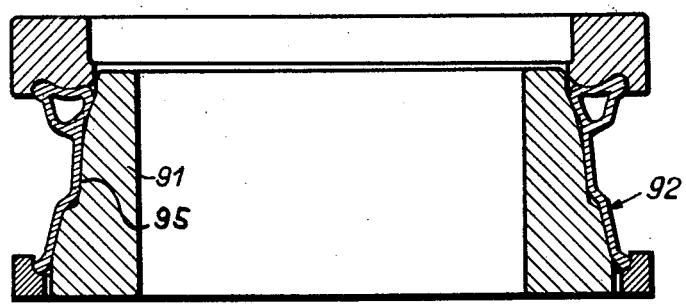
Figure 10:
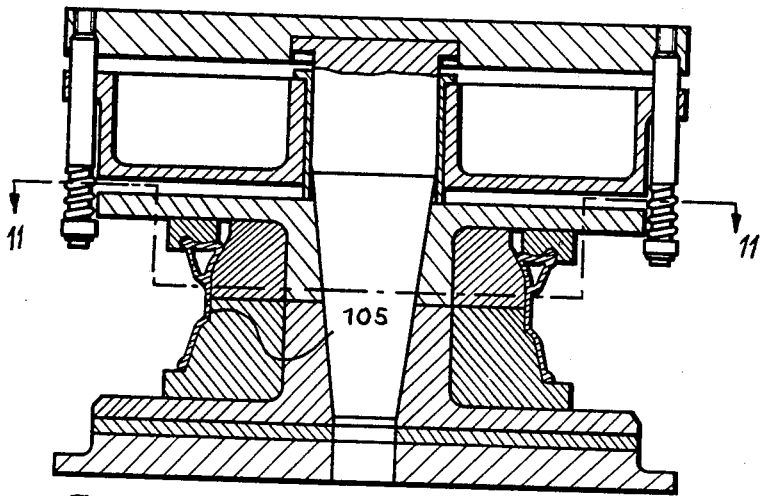
Figure 11:
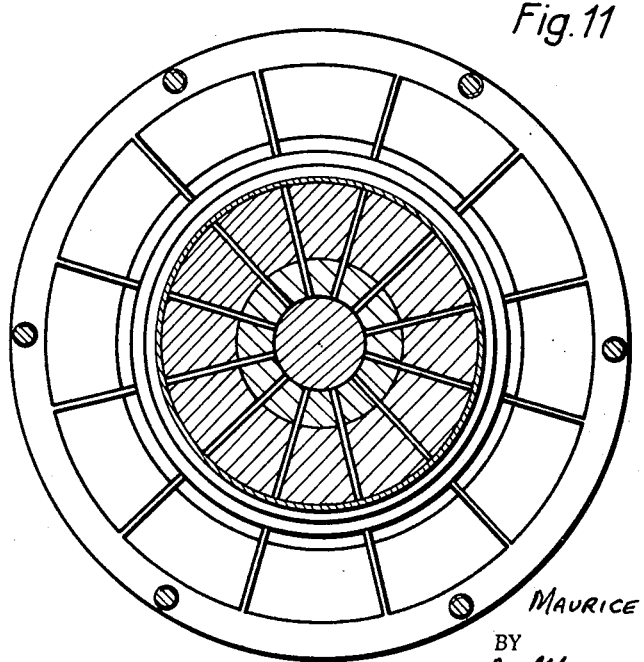

FIG. 3 indicates two different profiles of a section of the inner roll employed in circling the rim, the profile with the unbroken line being provided for preliminary circling and the profile indicated in dotted lines being provided for final circling;

FIG. 4 indicates two different profiles of an outer roll employed in circling the rim, the unbroken line indicating the contour of the preliminary circling roll profile and the dotted line indicating the contour of the final circling roll profile;

FIG. 5 is a schematic representation of the circling process indicating the oversizing of the rim side opposite to the hollow section of the rim, the additional expansion corresponding to the expansion of the hollow side of the rim;

FIG. 6 is a fragmentary front elevation of a welding key block;

FIG. 7 is a cross section of the key block indicated in FIG. 6;

FIG. 8 is a fragmentary perspective of the rim positioned on a welding support for a welding operation;

FIG. 9 is a transverse section of a calibrating, sizing and grooving process carried out on the stepped cone-shaped die;

FIG. 10 is a transverse section of a conventional die for comparison with the die indicated in FIG. 9, the die being employed for rims with cylindrical drop center beds;

FIG. 11 is a section taken on the line 11—11 of FIG. 10; and

Figure 12:
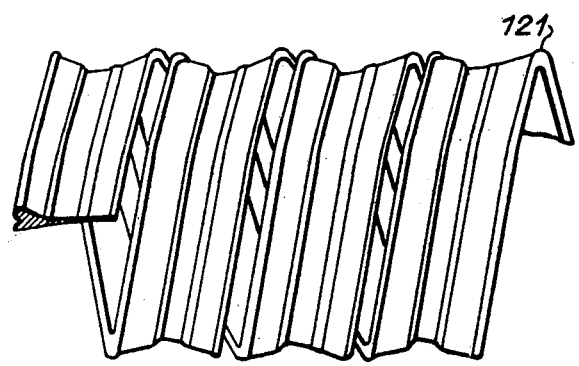

FIG. 12 is a perspective representation of a spirally wound rim of the same cross section.

Figure 1:
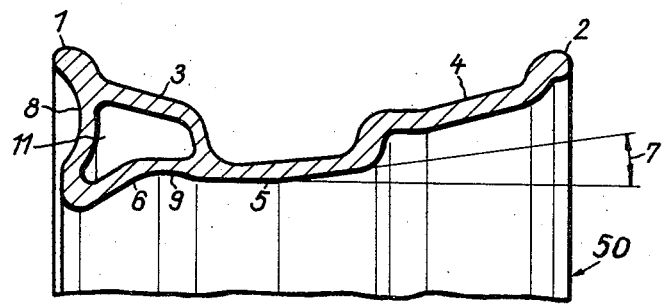
FIG. 1 is a fragmentary sectional view of a finished circled rim constructed in accordance with the invention.

In FIG. 1 there is illustrated a wheel rim generally designated 50 of the type with which the present invention is concerned. The rim is preferably for tubeless tires and is composed of two opposite low horns or flanges 1 and 2 with respective connecting rim shoulders 3 and 4 and a central drop center portion 5. The shoulders 3 and 4 have advantageously approximately at 15° inclination from the horizontal and they form a surface against which the tire bead of a tubeless tire is very tightly braced. The drop center portion between the rim shoulders permits mounting of tires on the rims.

In the embodiment illustrated, a 28° tapering angle of the spoke head of a wheeled spider (not shown) can be satisfactorily braced and secured to the laterally arranged taper-shaped clamping surface 6. The 28° clamping surface 6 is also known as a rim foot and in the present application geometrical forms and metallurgical references will be made in respect to sections on the "foot side" of the drop center 5 and the indication continues to the rim sections on the "other side" of the drop center 5.

In the present embodiment the drop center 5 has an angle of inclination of 4° from the center line of the axle. This angle is designated 7 in FIG. 1. Over the rim foot 6 and under the rim shoulder 3 is a hollow core 11, the walls of which have been specially designed to give extremely high structural strength in order to withstand the expanding forces between the wheel body and the rim.

The outer contour of the rim shoulders 3 and 4 and rim foot 6 is of an improved public standard and must be maintained within close tolerances. The mechanical shaping of the rim is, however, a very costly operation because machining the rims to the required tolerances presents certain difficulties. It is a feature of the present invention that a finished wheel rim may be produced from an extruded profile without any machining operation.

In the circling of the asymmetrical and tubular profiles, two main difficulties must be overcome to produce from the initial profile product designated 51 (FIG. 2) the final wheel rim 50 (FIG. 1): (1) The collapsing of the walls 3, 6 and 8 around the hollow core must be prevented; and (2) by virtue of the asymmetrical profile opposing compression on the hollow foot side the rim tends to circle with a smaller diameter on the shoulder 4 as compared with the shoulder 3.

In the manufacture of light metal tubes and light metal extruded profiles with a hollow core, circling operations have hitherto always been carried out with a filling. That is, with the use of sand, resin (collophonium), Wood's metal or ice applied within the cavity in order to prevent collapsing of the walls. Filling of the cavity is always an extremely difficult and complicated operation. When cutting the ends after circling, the hollow core must be repeatedly plugged and closed. Furthermore this method of preventing collapsing has the drawback that in the subsequent welding process residue from the filling process causes a diminution in the quality of the welding seam.

Figure 2:
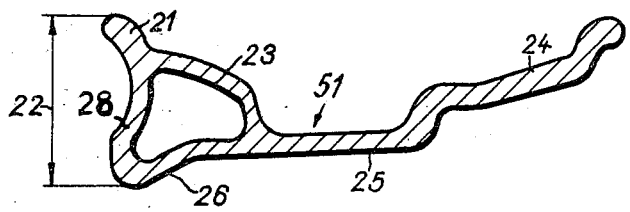
FIG. 2 is a sectional view of a rim profile as it appears after it is extruded.

In order to prevent the wall from collapsing when working without using a filling, an extrusion profile is required, such as indicated at 51 in FIG. 2. The height 22 from point 26 of the rim foot to the outer edge of the rim at the location of a horn 21 is greater than in the finished cross section. A rim shoulder 23 on the foot side is convexly shaped whereas a rim shoulder 24 is shaped at an angle of about 16°. The rim foot 26 has a larger radius than the rim foot sections 6 and 9 as indicated in FIG. 1, so that the radius smoothly conforms with the lower surface of the drop center 25.

In accordance with the invention, a rim bar profile 51 as indicated in FIG. 2 is extruded from a heat treatable corrosion resisting aluminum alloy including 1.5% Si and 1% Mg. This alloy may be one generally corresponding to ASA Standards 6061, 6053, 6051 or 6351. This extrusion profile is asymmetrical. If necessary, the extruded profile may be annealed after the extrusion process. Generally, however, this is not necessary. The extrusion profile is cut to a length which is 5% longer than the required rim circumference. By using a cross section as indicated in FIG. 2 the rim can be circled in two operations without any filling of the hollow core in the following manner: An extruded rim length generally designated 51 is placed over two spaced outer roll members 42 (FIG. 5) indicated in section in FIG. 4 by the full unbroken contour designated 43 (see FIGS. 4 and 5).

An inner cylinder 31 is employed on the interior of the rim as indicated in FIG. 5 and as shown in section in FIG. 3 by the unbroken contour 32. The corresponding section 43 of the convex rim shoulder 23 (foot side of the wheel rim) will be concave. The deformation of the cross section on the foot side of the rim due to the first circling operation is comparatively small and the shape of the outer and inner walls of the hollow core is maintained.

When circling with the inner roll 31 having the contour 32, a rim shoulder angle designated by the numeral 33 of approximately 25° is produced facilitating the additional expansion of the other side of the rim shoulder 24.

The corresponding contour 44 of the outer rolls 42 maintains at 15° shoulder inclination of the other side. The expansion of the other side of the rim shoulder 24 is indicated schematically in FIG. 5. This additional expansion of the other side of the rim 24 (FIG. 2) is necessary to compensate for the increased extension occurring during the encircling at the side of the rim foot. It will be understood that the foot profile 26 and particularly the rim shoulder 23 become more elongated than the rim shoulder 24 of the other side due to the stiffness of its section and the resistance of the rim foot to compressive force.

After the preliminary rolling the extended length of the precircled rim is cut accurately to the required circumferential length. Thereafter, the rolls for the final circling process are, as indicated in FIGS. 3 and 4, of line contours designated 35 in dotted lines. Thus the rim shoulder 3 as indicated in FIG. 1 becomes flattened out and simultaneously the rim foot 6 is formed to the finished concave vaulted and standardized rim profile 6, 9 as indicated in FIG. 1.

The next operation includes calibrating and cutting of the circumferential length of rim profile to the required size after making allowance for a welding gap to be formed when the edges are joined together. Two ventilation holes are drilled in the web 8 of the hollow core and a valve hole is drilled or stamped into the drop center wall on the opposite side of the rim weld. The ventilation holes prevent the expansion of harmful gases produced in the welding process (for instance occurring when blowing off of the argon stream) and other heat treating processes. The ventilation holes may be closed after the heat treatment is completed.

Before welding, a weld wedge 61, as indicated in FIGS. 6 and 7, with a lowermost portion of a configuration comparable to the hollow core of the tire rim is inserted into the hollow core 11. The extrusion handle portion 62 of this wedge is employed for inserting the wedge into the core and thereafter it is broken off.

The rim is then placed on a profiled copper block generally designated 81 having a groove extending upwardly along a top base 84 which is contoured in the manner of the outer face of the rim. Cross welding of the seam takes place over the groove 82 and over a welding gap width designated 83. The width of the welding gap 83 and the width of the welding groove 32 depend upon the width 71 of the welding wedge 61 as indicated in FIG. 7. The welding wedge has, in addition to its centralizing function, a function of preventing indentations and gaps on the inside edge of the hollow core. If welding wedges are not used the welding seam may become irregular in depth and between the cylindrical parallel walls of the welded edges and the V-shaped weld area, pointed indentations or gaps might develop. The welding wedge 61 further permits the welding to be carried out using a high current without any danger of melting the walls of the hollow core.

The cross welding of the surface seam is carried out by a shielded inert gas arc welding process (Sigma). The quality of the wire welding electrodes is important and they should be manufactured from a precipitation hardened aluminum alloy with approximately 4% silicon and 1% magnesium. The subsequent hardness of these welding electrodes must be comparable to the precipitation hardened condition of the rim alloy.

After welding the rim is precipitation hardened. The rim is first subjected to a solution heat treatment for 15 minutes in a furnace at a temperature of 535 to 540° C. Quenching, i.e. cooling in water follows at a temperature of from 20 to ±10° C. As is necessary with all ring shaped workpieces made of steel or light metal alloy with a relatively complicated profile, the rim must be calibrated after welding and solution heat treatment in order to correct any deformations occurring during the heat treatment. With objects made of light metal alloys this can be achieved advantageously immediately after the heat treatment.

Calibration takes place in a stepped conically shaped die 91 over which the wheel rim generally designated 92 may be inserted. The die 91 has no radial division but has a conical drop center section 95 for conforming the outline of the wheel rim 92. Subsequently the rim is placed in a furnace for a period of 8 to 10 hours at a temperature of 155 to 160° C. to thereby effect artificial aging. The rim may be pickled or etched in a 10% potassium bisulphate solution for instance at 50° C. for approx. 15 minutes. If this treatment is carried out at such elevated temperature, it is preferable to effect the pickling prior to the aging treatment. On the other hand the pickling or etching may be effected in a bath having ambient temperature and in this case it may follow the aging treatment.

An extremely important feature of the process is the selection of an alloy which in its fully annealed condition has only a very small proportion of the mechanical strength of its hardened condition. This important mechanical characteristic permits circling with less costly machines and less power. For instance the calibrating or sizing process in the die 91, requires a pressure of only 50 or 60 tons. This is only a fraction of the pressure required for producing steel rims.

The mechanical specific strength of the alloy specified above is as follows:

|  | Fully Annealed | Precipitation Hardened |
|---|---|---|
| Yield _____kg./mm.$^2$__ | 4–8 | 27–38 |
| Tensile _____kg./mm.$^2$__ | 10–12 | 32–42 |
| Elongation _____percent__ | 30 | 10–12 |
| Brinell Hardness _____kg./mm.$^2$__ | 35 | 110 |

The sequence of steps or operations as explained above has many advantages over the conventional method of producing rims:

As a result of the use of an alloy with low yield and tensile strength when annealed the circling operation and calibrating can be performed with considerably smaller and less costly working tools and machines.

The conically formed base of the drop center makes it practicable to carry out the calibrating of the rim by expansion in the one-sided stepped conical die 91 (FIG. 9). The conventional method of carrying out this process considerably increases the cost of production in many ways, for example in view of the requirement for a segmented wedge-action calibrating die for the cylindrical drop center base 105 (FIG. 10 and FIG. 11).

With the present method, all machining operations of the rims are thus eliminated. By employing a rim profile with a hollow core of the type disclosed herein (high profile), it is possible to produce a rim of light weight using less material and which is sufficiently strong.

Due to the bulged convex walls of the extrusion profile, the circling operation can be achieved without any filling. As has been explained above the filling and plugging of such a high profile with sand, resin (collophonium), Wood's metal, ice, etc., is a very complicated and costly operation which necessitates, from time to time, several difficult opening and closing operations.

As a result of being able to achieve the circling operation without filling there is absolutely no possibility of any filling material remaining in the welding seam and causing corrosion or contamination or noise from loose parts tumbling within the hollow chamber.

The shielded inert gas arc welding process (Sigma), using the previously mentioned special electrodes, reduces working expense and investments. The prior art process of high resistance butt welding necessitates an exceptionally high current consumption or extremely expensive machines. The applied process in superseding the prior art resistance butt welding method prevents the introduction of small particles of oxidized metal into the inner chamber walls of the rim. Such extraneous particles melt and disseminate, into the walls of the rim, causing a consequential loss in strength of the rim. The applied process excludes any possible losses in strength due to such particles becoming trapped.

Using a welding bed of pure copper with a groove under the welding seam permits, with this process, the use of a high current which reduces the welding time to a minimum (about 5 minutes). With the arrangement shown in FIG. 8, it is possible to weld walls with a thickness of 12 mm. without previous root welding.

The employment of the two-sided conical spacing wedge in the center of the welding seam makes it easier to regulate the exact length of the rim and it also ensures that on the inner side of the welding seam no indentations or gaps can be formed. By using a corrosion resisting alloy of type 1.5 Si, 1 Mg, the rim can be used for any normal work without having a protective coating.

The pre-rounding process of the rim, as shown in FIG. 12, is made considerably easier by the use of longer pressed profile bars, for example a tenfold rim length in a spiral 121, as shown in FIG. 12. The joining of the rims is staggered as they are cut and each is individually and finally rounded. This operation is only possible when there is no necessity to use a filling material in the hollow core.

Thus, the invention provides a method for producing replaceable light metal steep shouldered drop center rims particularly adapted for use as wheel rims with spoke wheels of heavy duty vehicles and trailers. A one-sided unsymmetrical wheel rim having a hollow space defined on one side is extruded from a material which is capable of being hardened, such as a corrosion resisting aluminum alloy. The extruded profile includes a convex rim shoulder formed adjacent to the hollow space and an arched base contoured rim foot with a drop center formed with around a 4° inclination.

The wheel rim profile is circled in a soft annealed condition without filling the hollow space, while at the same time expanding the wheel rim on the opposite side so that expansion on both sides is compensated at the same time during the circling around the wheel rim. The wheel rim is then finish-circled or rounded while it is flattened simultaneously at the location of the rim shoulder. The arched wheel rim base or rim foot is simultaneously exactly shaped and deformed to the desired configuration of a gradual arch shape.

The wheel rim is then cross-welded by means of an electric arc welding process within a gas atmosphere and with a consuming electrode by placing the adjacent edges of the rim over a welding jig member having an aligning gap for facilitating welding. The welding is carried out after a welding wedge is placed in the hollow core portions of adjacent ends to insure that the walls of the hollow space are not deformed in any manner and that no uneven welding portions are formed on the interior of the rim.

Thereafter, the welded rim is hardened and calibrated to the finished size by placing the wheel rim in a cone-shaped die and applying pressure to effect a stepped cone pressing of the rim to the desired configuration.

In some instances it is desirable to cut the extruded material prior to circling into a length equal to the finished circumferential length of the wheel rim plus 5%. In some instances, after the rim is finish-circled, the wheel rim is cut down to the exact circumferential dimension required less the width of the welding seam. Before welding at least two aeration holes or vents are preferably drilled inwardly to the hollow space. In the drop center rim bottom a valve bore is provided to receive the tire valve. This valve bore is advantageously arranged at a location diametrically opposed to the welding wedge.

For the purpose of cross-welding a welding wire is used, composed of a hardened aluminum alloy with about 4% silicon and 1% magnesium. Welding is advantageously accomplished at high current value without root welding on the profile copper block 81 as the welding base which includes the welding groove 82.

Hardening of the rim is effected in a furnace at a temperature of from 535 to 540° C. during 15 minutes and quenching is effected in water from 20° C. to ±10° C. Calibration is performed immediately after the quenching by a stepped conical pressing in a stepped conical shaped die 91. After the calibration there is a hardening of the rim at 155 to 160° C. for about 8 to 10 hours. The rim is advantageously picked in a 10% potassium bisulphate solution.

While a specific embodiment of the invention has been shown and described in detail to illustrate the application of the invention principles, it will be understood that the invention may be embodied otherwise without depart- from such principles.

What is claimed is:
1. The process of forming a tire rim of aluminum alloy material comprising extruding a length of wheel rim material to form an unsymmetrical rim profile length with a hollow portion formed along its length at one side and with the profile length formed to an oversize configuration, transforming the rim into a soft annealed condition by heating, thereafter circling the wheel rim profile length in a soft annealed condition and without filling the hollow space, and simultaneously expanding the profile length by circling on the opposite side in a manner to compensate for the expansion of the hollow portion at the same time during rounding, rounding the profile length into a wheel rim while simultaneously shaping the rim into desired configuration; cross-welding the rim to join the opposite ends together, hardening the rim by heating it for a period of time and calibrating the wheel rim to a finished size by placing the rim in a cone-shaped die and applying pressure thereto.

2. A method according to claim 1, wherein said cross-welding is carried out by electric arc welding with an inert gas atmosphere and with a consuming electrode.

3. A method according to claim 1, wherein the wheel rim is extruded with shoulder portions formed in a convex configuration which are deformed in a finish-circling step to a substantially straight configuration.

4. A method according to claim 1, wherein a hardenable corrosion resistant aluminum alloy consists essentially of 1.5% silicon, 1.0% magnesium, and the balance aluminum.

5. A method according to claim 1, wherein rollers are employed for circling the rim with an inclination of approximately 25°.

6. A method according to claim 1, including drilling a hole into the wall defining the hollow space of the rim prior to welding.

7. A method according to claim 1, wherein prior to cross-welding a welding wedge is placed into the hollow space of the rim.

8. A method according to claim 1, wherein a welding wire employed for cross-welding is an aluminum alloy consisting essentially of 4% silicon, 1% magnesium and the balance aluminum.

9. A method according to claim 1, wherein the welding is carried out at very high current value without root welding on a profiled copper block as a welding base.

10. A method according to claim 1, wherein the hardening is effected in a furnace at a temperature of 535 to 540° C. for 15 minutes and that quenching is effected in water of between 20° C. to ±10° C.

11. A method according to claim 10, wherein calibration is performed immediately after quenching using stepped conical pressing in a stepped conical-shaped profile die.

12. A method according to claim 11, wherein after the calibration the rim is hardened at 155 to 160° C. for about 8 to 10 hours.

13. A method according to claim 1, wherein a pre-circling of a long length of extruded rim material is effected without filling the hollow space in the wheel rim in order to form a spiral which is subsequently cut up into rings which are finish-circled.

14. A method according to claim 1, wherein the wheel rim is picked in a hot 10% potassium bisulphate solution.

References Cited by the Examiner
UNITED STATES PATENTS

| | | | |
|---|---|---|---|
| 2,034,360 | 3/36 | Sill | 29—159.1 |
| 2,139,833 | 12/38 | Jeune | 29—159.1 |

FOREIGN PATENTS 680,355  10/52  Great Britain.

OTHER REFERENCES

Aluminum 6063, Alloy Digest, Filing Code: Al 42, Aluminum Alloy, August, 1956, published by Engineering Alloys Digest, Inc., Upper Montclair, New Jersey.

WINSTON A. DOUGLAS, Primary Examiner.

MARCUS U. LYONS, DAVID L. RECK, Examiners.